United States Patent
Min

(10) Patent No.: US 7,144,035 B2
(45) Date of Patent: Dec. 5, 2006

(54) MEMBRANE SWITCH MOUNTING STRUCTURE FOR VEHICLE

(75) Inventor: Jun-Yong Min, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 378 days.

(21) Appl. No.: 10/749,213

(22) Filed: Dec. 30, 2003

(65) Prior Publication Data

US 2005/0087964 A1   Apr. 28, 2005

(30) Foreign Application Priority Data

Oct. 24, 2003   (KR) ...................... 10-2003-0074652

(51) Int. Cl.
*B60R 21/16*   (2006.01)
(52) U.S. Cl. .................... 280/731; 280/729; 280/728.3
(58) Field of Classification Search ............... 180/731, 180/728.3; 200/61.54, 61.55, 729
See application file for complete search history.

(56) References Cited

U.S. PATENT DOCUMENTS 5,308,106 A * 5/1994 Heidorn ................... 280/728.3
5,413,376 A * 5/1995 Filion et al. ............. 280/728.3
5,449,197 A   9/1995 Kerner ...................... 280/731
5,465,998 A * 11/1995 Davis ........................ 280/731
5,575,498 A * 11/1996 Elqadah et al. ............ 280/731
5,577,767 A * 11/1996 Nemoto ..................... 280/731
5,723,834 A * 3/1998 Hambleton et al. ...... 200/61.54
5,836,609 A * 11/1998 Coleman ................ 280/728.3
6,179,325 B1 * 1/2001 Igawa ....................... 280/731

FOREIGN PATENT DOCUMENTS

| DE | 41 33 007 A1 | 4/1992 |
| DE | 43 42 440 C2 | 12/1993 |
| DE | 43 42 441 C2 | 7/1994 |
| DE | 0 783 996 A1 | 7/1997 |
| JP | 10-228839 | 8/1998 |

* cited by examiner

*Primary Examiner*—Paul N. Dickson
*Assistant Examiner*—Tiffany L. Webb
(74) *Attorney, Agent, or Firm*—Morgan, Lewis & Bockius LLP

(57) ABSTRACT

The membrane switch mounting structure for a vehicle includes a switch mounting space at a front side of a cushion cover facing the inner side of a horn cover, and a membrane switch and a supporting plate together inserted into the switch mounting space, thereby reducing the manufacturing cost and the number of steps in the manufacturing process and increasing productivity.

2 Claims, 3 Drawing Sheets

MEMBRANE SWITCH MOUNTING STRUCTURE FOR VEHICLE

CROSS-REFERENCE TO RELATED APPLICATIONS

This application claims priority to Korean Patent Application No. 10-2003-0074652, filed on Oct. 24, 2003, which is incorporated fully herein by reference.

FIELD OF THE INVENTION

The present invention relates to a membrane switch mounting structure for a vehicle that closes electrical contact points to operate a horn.

BACKGROUND OF THE INVENTION

A horn-operating switch is typically installed at a central portion of a steering wheel. The horn-operating switch is mounted at the central portion of the steering wheel even in a vehicle equipped with a Driver's Air Bag (DAB).

A thin plate-shaped membrane switch is generally used as the horn-operating switch mounted at the central portion of the steering wheel together with the DAB.

SUMMARY OF THE INVENTION

Embodiments of the present invention provide a membrane switch mounting structure for a vehicle adapted to install a membrane switch by using a cushion cover to enclose an air-bag cushion, thereby reducing the cost and number of process steps in manufacturing and increasing productivity.

In a preferred embodiment of the present invention, the membrane switch mounting structure for a vehicle comprises a switch mounting space formed at the front side of a cushion cover disposed to face the inner side of a horn cover. A membrane switch is inserted into the switch mounting space.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the accompanying drawings.

Figure 1:
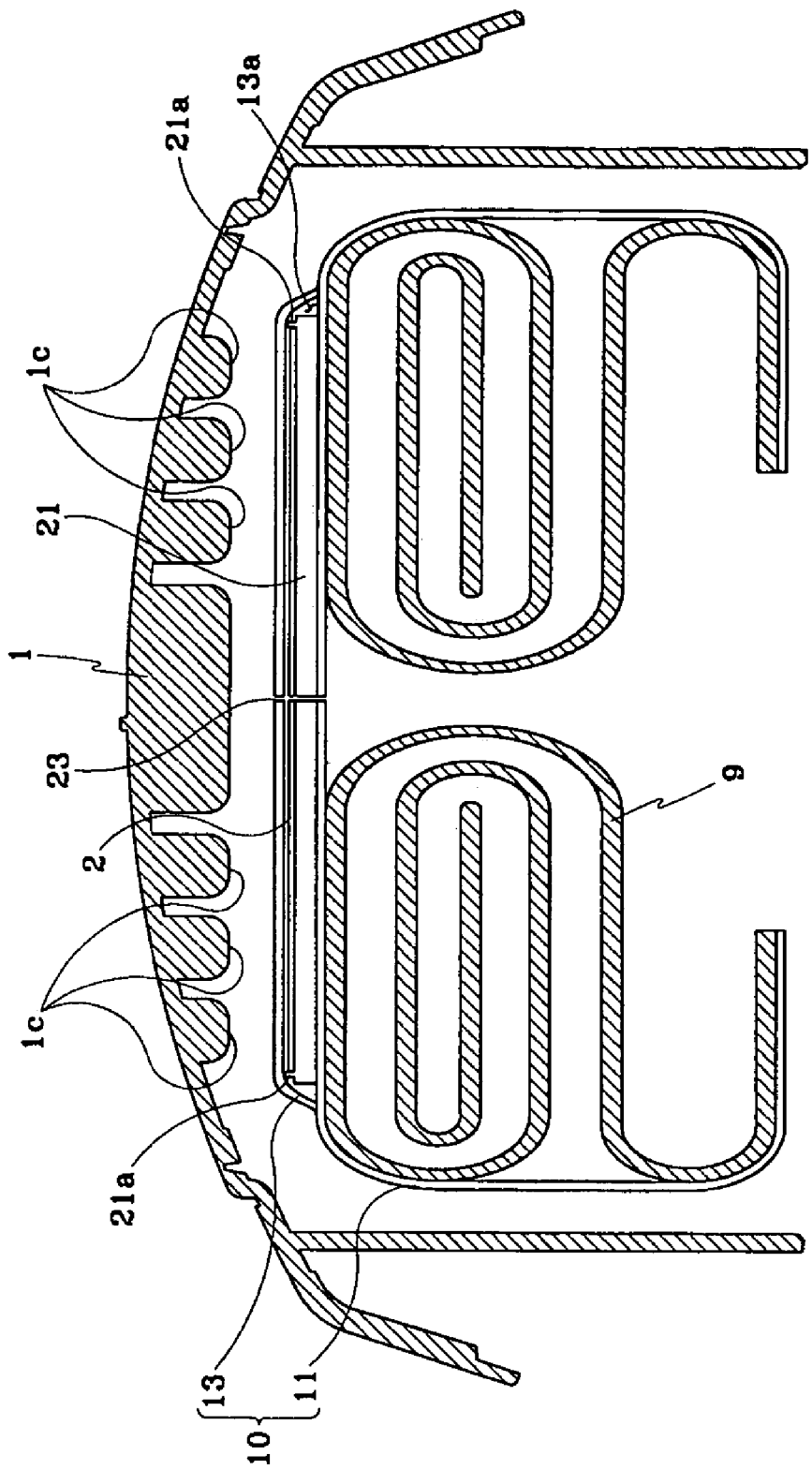
FIG. 1 illustrates a membrane mounting structure for a vehicle according to an embodiment of the present invention, and a cross-sectional view of a horn cover and an air-bag cushion of a DAB module, both disposed at a central portion of a steering wheel.
Figure 2:
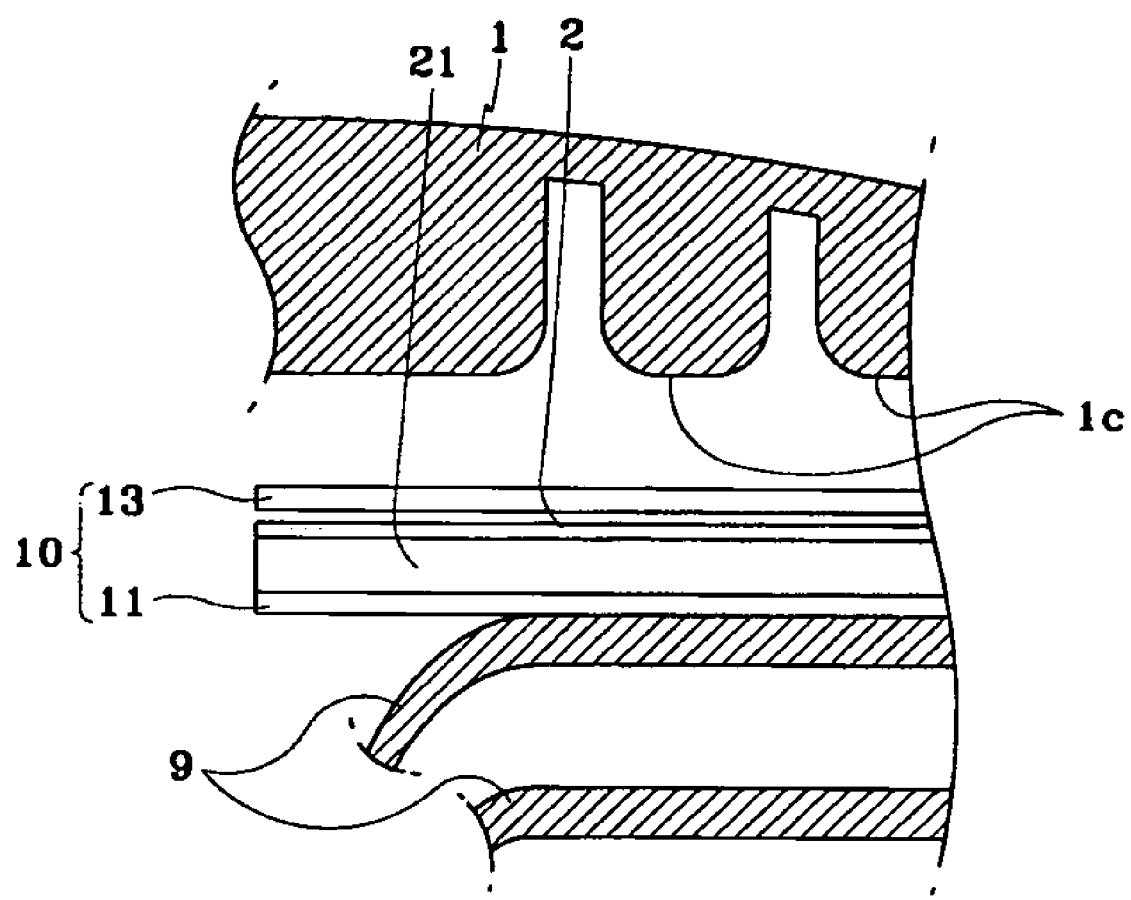
FIG. 2 is a detailed view of the principal part of FIG. 1.

As shown in FIGS. 1 and 2, an air-bag cushion 9 constituting a DAB module is covered by a cushion cover 10 disposed within a horn cover 1 and placed at a central portion of a steering wheel.

A thin plate-shaped switch mounting space 13a is formed at the front side of the cushion cover 10 facing the inner side of the horn cover 1. A membrane switch 2 is inserted into the switch mounting space 13a to close the contact points to thereby operate the horn.

The cushion cover 10 is composed of a first cushion cover 11 enclosing the air-bag cushion 9, and a second cushion cover 13 integrally formed at the front of the first cushion cover 11 while forming a certain space from the first cushion cover 11. The switch mounting space 13a is formed between the first cushion cover 11 and second cushion cover 13. There are also a plurality of ribs protruding inward from the horn cover 1. The ribs 1c contact the second cushion cover 13 when the horn cover 1 is pressed to operate the horn, and activates the membrane switch 2.

The membrane switch 2, in which its bottom side connects with a supporting plate 21 that is formed by plastic in a prescribed thickness, is inserted into the switch mounting space 13a.

The supporting plate 21 supports the membrane switch 2 when the horn is activated, thereby preventing destabilization of the membrane switch 2.

Figure 3:
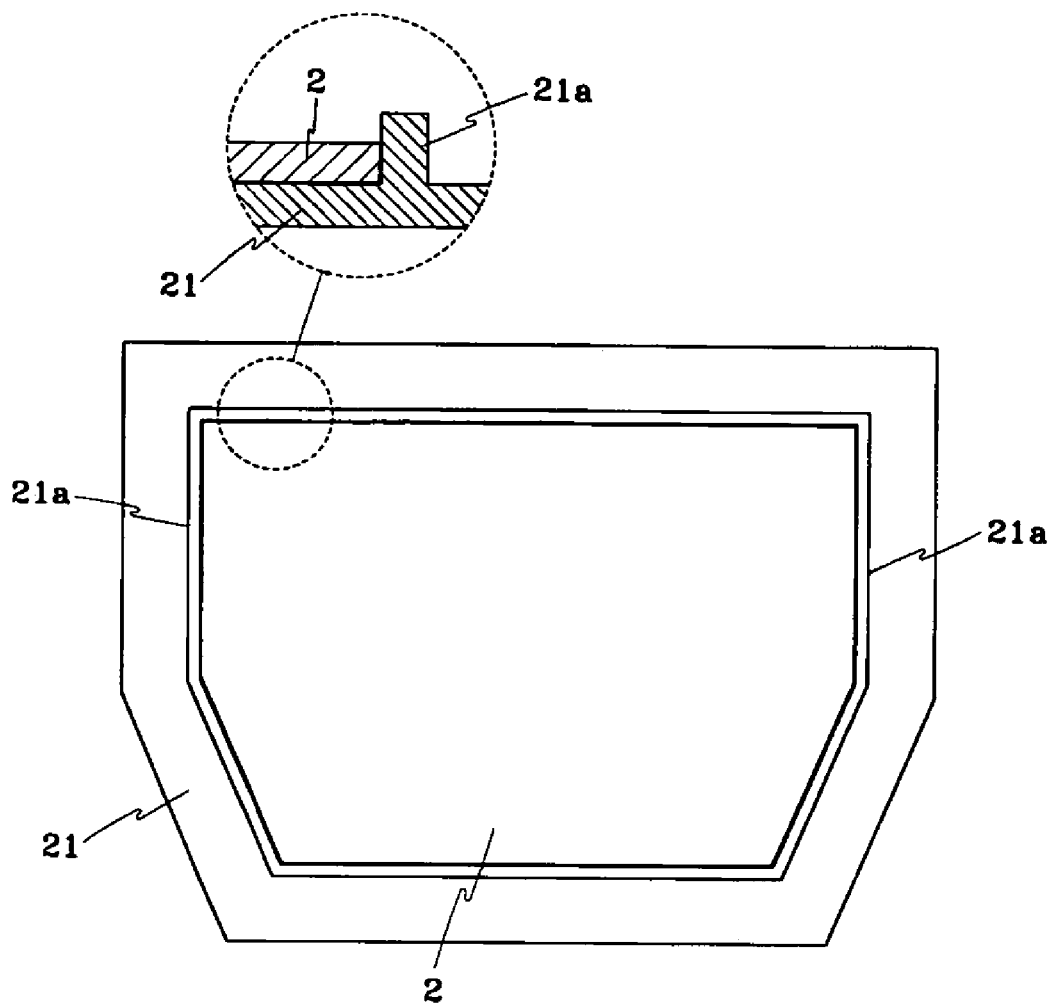
FIG. 3 is a top view of a membrane switch placed on a supporting plate.

With reference to FIG. 3, the upper side of the supporting plate 21 connects with the bottom side of the membrane switch 2, and is formed with a plate protruder 21a that upwardly protrudes out from the upper side of the supporting plate 21 and has a shape corresponding to that of the edge of the membrane switch 2. The membrane switch 2 is placed inside the space covered by the plate protruder 21a. Thus, the membrane switch 2, whose edge is supported by the plate protruder 21a, connects with the supporting plate 21.

Figure 4:
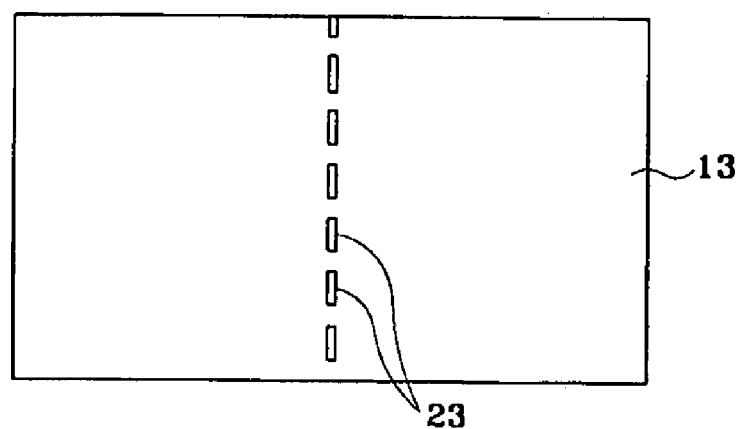
FIG. 4 is a top view of a second cushion cover.

As shown in FIGS. 1 and 4, there are perforations 23 on the first cushion cover 11, second cushion cover 13, membrane switch 2, and supporting plate 21. The air-bag cushion 9 inflates through the perforations 23.

As apparent from the foregoing, there is an advantage in the present invention in that the membrane switch is provided in a simple structure without recourse to coupling components (e.g., a rivet, screw or the like) and coupling process (e.g., ultrasonic heat welding), thereby reducing the number of steps in the manufacturing process and increasing productivity.

There is another advantage in that the membrane switch and supporting plate are installed at the front side of the cushion cover enclosing the air-bag cushion, thereby decreasing the manufacturing cost by reducing the number of steps in the manufacturing process and increasing productivity.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

What is claimed is:

1. A membrane switch mounting structure for a vehicle, comprising:
   a first cushion cover which substantially encloses an airbag cushion;
   a second cushion cover, disposed between said first cushion cover and a horn cover;
   a switch mounting space disposed between said first and second cushion covers and enclosed by said cushion covers;

a supporting plate disposed in said switch mounting space; and a membrane switch disposed in said switch mounting space between said supporting plate and said second cushion cover;

wherein each of said first cushion cover, said second cushion cover, said membrane switch, and said supporting plate comprises perforations.

2. The structure as defined in claim 1, wherein said supporting plate comprises a plate protruder disposed on at least one side of said supporting plate, said plate protruder having a frame shape that corresponds to a shape of an edge of said membrane switch, and said edge of said membrane switch is supported by said plate protruder.

* * * * *